(12) United States Patent
Robbins et al.

(10) Patent No.: US 11,796,803 B2
(45) Date of Patent: Oct. 24, 2023

(54) MOVEMENT OF GRAPHICAL OBJECTS BASED ON USER MOVING BETWEEN VIEWING DISPLAY LOCATIONS

(71) Applicant: Lenovo (Singapore) Pte. Ltd., Singapore (SG)

(72) Inventors: Timothy Robbins, Avon, IN (US); Matthew Fardig, Boonville, IN (US); Sathish Kumar Ganesan, Morrisville, NC (US); Anthony Mourey, Fort Wayne, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/699,821

(22) Filed: Mar. 21, 2022

(65) Prior Publication Data
US 2023/0296884 A1 Sep. 21, 2023

(51) Int. Cl.
*G02B 27/00* (2006.01)
*G06F 3/01* (2006.01)
*G02B 27/01* (2006.01)

(52) U.S. Cl.
CPC ....... *G02B 27/0093* (2013.01); *G02B 27/017* (2013.01); *G02B 27/0179* (2013.01); *G06F 3/012* (2013.01); *G02B 2027/0138* (2013.01); *G02B 2027/0141* (2013.01)

(58) Field of Classification Search
CPC .............. G02B 27/0093; G02B 27/017; G02B 27/0179; G02B 2027/0138; G02B 2027/0141; G06F 3/012
See application file for complete search history.

(56) References Cited

U.S. PATENT DOCUMENTS

| | | | | |
|---|---|---|---|---|
| 8,643,951 | B1* | 2/2014 | Wheeler | G06F 3/0481 359/630 |
| 10,860,032 | B2* | 12/2020 | Lyer | G06V 40/103 |
| 11,521,581 | B2* | 12/2022 | Burns | G09G 5/373 |
| 2014/0285403 | A1* | 9/2014 | Kobayashi | G02B 27/017 345/8 |
| 2014/0375680 | A1* | 12/2014 | Ackerman | G06F 3/012 345/633 |

(Continued)

OTHER PUBLICATIONS

"15 Shocking Statistics on Neck Pain and Text Neck You Should Know", Ergonomic Trends, Jul. 17, 2021, retrieved from https://ergonomictrends.com/shocking-neck-pain-and-text-neck-stats/.

(Continued)

*Primary Examiner* — Dmitriy Bolotin
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to receive input from one or more sensors and, based on the input from the one or more sensors, determine that a trigger related to a user moving between viewing a first display location and a second display location is satisfied. Responsive to the determination, the instructions may be executable to move at least one graphical object presented on at least one display from the first display location to a third display location different from the first and second display locations.

20 Claims, 7 Drawing Sheets

(56) References Cited

U.S. PATENT DOCUMENTS

| | | | | |
|---|---|---|---|---|
| 2015/0084864 | A1* | 3/2015 | Geiss | G06F 21/316 |
| | | | | 345/158 |
| 2015/0212576 | A1* | 7/2015 | Ambrus | G06F 3/0482 |
| | | | | 345/156 |
| 2016/0098579 | A1* | 4/2016 | Ballard | H04W 76/10 |
| | | | | 726/27 |
| 2017/0148221 | A1* | 5/2017 | Lyren | G02B 27/0093 |
| 2019/0187876 | A1* | 6/2019 | Platt | G06F 3/017 |
| 2019/0311541 | A1* | 10/2019 | VanBlon | G06F 3/012 |
| 2020/0066041 | A1* | 2/2020 | Qian | G06V 40/107 |
| 2020/0081525 | A1* | 3/2020 | Peterson | G06F 3/167 |
| 2020/0319471 | A1* | 10/2020 | Goslin | G02B 27/0179 |
| 2021/0096733 | A1* | 4/2021 | Greenebaum | G06F 3/1423 |
| 2021/0185294 | A1* | 6/2021 | Malaika | H04N 13/161 |

OTHER PUBLICATIONS

"Convolutional neural network", Wikipedia, retrieved on Feb. 11. 2022 from https://en.wikipedia.org/wiki/Convolutional_neural_network.

"Long short-term memory", Wikipedia, retrieved on Feb. 11, 2022 from https://en.wikipedia.org/wiki/Long_short-term_memory.

"Recurrent neural network", Wikipedia, retrieved on Feb. 11, 2022 from https://en.wikipedia.org/wiki/Recurrent_neural_network.

"Transformer (machine learning model)", Wikipedia, retrieved on Feb. 11, 2022 from https://en.wikipedia.org/wiki/Transformer_(machine_learning_model).

* cited by examiner

MOVEMENT OF GRAPHICAL OBJECTS BASED ON USER MOVING BETWEEN VIEWING DISPLAY LOCATIONS

FIELD

The disclosure below relates to technically inventive, non-routine solutions that are necessarily rooted in computer technology and that produce concrete technical improvements. In particular, the disclosure below relates to techniques for moving graphical objects based on a user moving between viewing display locations.

BACKGROUND

As recognized herein, people are spending more and more time in front of their electronic devices. As also recognized herein, various physical ailments such as neck strain can arise from prolonged use of such electronic devices. Current electronic devices are inadequate at addressing this. Accordingly, there are heretofore no adequate solutions to the foregoing computer-related, technological problem.

SUMMARY

Thus, in one aspect a device includes at least one processor and storage accessible to the at least one processor. The storage includes instructions executable by the at least one processor to receive input from one or more sensors and, based on the input from the one or more sensors, determine that a trigger related to head movement is satisfied. The instructions are also executable to, responsive to the determination, move at least one graphical object presented on at least one display from a first display location to a second display location.

Accordingly, in some examples the at least one display may include a first display, the first display location and the second display location may both be located on the first display, and the second display location may be more centrally-located on the first display than the first display location.

Additionally or alternatively, the second display location may be more centrally-located than the first display location relative to an axis defined by a user looking straight ahead.

Also in addition to or in lieu of the foregoing, the at least one graphical object may include a first graphical object, and the second display location may be identified based at least in part on the second display location being between the first display location and a third display location at which a second graphical object is presented while the first graphical object is presented at the first display location. In some example embodiments, the instructions may even be executable to, responsive to the determination, move the first graphical object to the second display location and move the second graphical object to a fourth display location that is also between the first and third display locations. If desired, the first, second, third, and fourth display locations may be along a same axis in an X-Z plane and, for example, the same axis may be an axis that is orthogonal to the X axis or Z axis of the X-Z plane.

In some example implementations, the one or more sensors may include at least one camera, computer vision may be executed using the input from the at least one camera to make the determination, and the device itself may even include the at least one camera.

Also in some example implementations, the one or more sensors may include one or more inertial sensors disposed on a headset. The device may even include the one or more inertial sensor and the headset.

In various examples, the trigger may include a particular number of head movements within a predetermined period of time. Or if desired the trigger may include head movements of more than a predetermined amount. Or if desired the trigger may include a particular number of head movements of more than a predetermined amount within a predetermined period of time.

In another aspect, a method includes receiving, at a device, input from one or more sensors and determining that a trigger related to head movement is satisfied based on the input from the one or more sensors. The method also includes, responsive to the determining, moving a first graphical object presented on at least one display from a first display location to a second display location and moving a second graphical object presented on the at least one display from a third display location to a fourth display location. The second and fourth display locations are between the first and third display locations.

In various examples, the trigger may be a trigger related to repetitive head movement and/or extreme head movement. The trigger may be defined in settings accessible to the device.

In still another aspect, at least one computer readable storage medium (CRSM) that is not a transitory signal includes instructions executable by at least one processor to receive input from one or more sensors and, based on the input from the one or more sensors, determine that a trigger related to a user moving between viewing a first display location and a second display location is satisfied. Responsive to the determination, the instructions are executable to move at least one graphical object presented on at least one display from the first display location to a third display location. The third display location is different from the first and second display locations.

In some examples, the first, second, and third display locations may all be along a same axis in an X-Z plane.

Also in some examples, the trigger may include a particular number of head movements of more than a predetermined amount within a predetermined period of time. The one or more sensors may include one or more cameras from which the input may be received. The at least one graphical object may progressively move from the first display location to the third display location so that, while progressively moving, the at least one graphical object may be presented at a fourth display location between the first and third display locations prior to being presented at the third display location.

The details of present principles, both as to their structure and operation, can best be understood in reference to the accompanying drawings, in which like reference numerals refer to like parts, and in which:

BRIEF DESCRIPTION OF THE DRAWINGS

FIGS. 3A-5C illustrate various examples of a device moving graphical objects closer together to address neck strain consistent with present principles;

DETAILED DESCRIPTION

Among other things, the detailed description below helps address neck strain related to a user viewing monitors and other displays. Accordingly, devices and methods described below may detect excessive head/neck movement and reorganize applications on a user's monitor(s) to help reduce neck strain.

Detection may include using computer vision to detect repetitive or extreme head/neck movements (e.g., up and down, left to right, or any combination of those). Additionally or alternatively a sensor-based device worn on user's head may be used to detect repetitive or extreme head/neck movements (e.g., mounted on glasses, worn on a headband, etc.). Other methods and sensing devices may also be used The sensor input might then be comparing to a predefined algorithm (e.g., involving angle of movement, distance of computer user from display, etc.) to determine what is considered extreme. Note further that extreme may vary by user. Accordingly, the devices and methods below may utilize pre-programmed values based on common angles/distance from displays to make generalized assumptions about what is considered extreme. Polling or prompting a given user may also be used to periodically question the user about their level of comfort (e.g., "have you experienced any head/neck discomfort in the past X minutes?") and then the user's responses may be compared to the actual head movements that were recorded during that time frame. This can allow an artificial intelligence (AI) model to determine what is considered extreme for that user.

Then, if it is determined that the user is performing extreme/repetitive movements of the head/neck, the device may take corrective action. For instance, application windows may begin to slowly move toward a display point that is central to the extremes of head/neck movement. Application movement may continually occur until a more comfortable/less strenuous amount of head/neck movement is realized.

If desired, application movement may be constrained to a single dimension (e.g., left/right, up/down) or can be movement in any direction.

Also if desired, application movement may be constrained to visible/currently-presented windows only in certain examples.

Additionally, application movement may include moving a single window or a cluster of windows or other graphical objects.

Moreover, a user may even define applications that are allowed to move, and others that are not allowed to move.

AI may also be used to determine the most-commonly activated/engaged windows, and only move those in certain examples.

Further, note that movement of various graphical objects may occur across monitors in a multi-display system. Monitors may be laid out in any desired orientation but still used consistent with present principles.

What's more, in some examples, historical analysis of adjustments made in the past can be used for more-central default starting positions when applications are reopened later.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
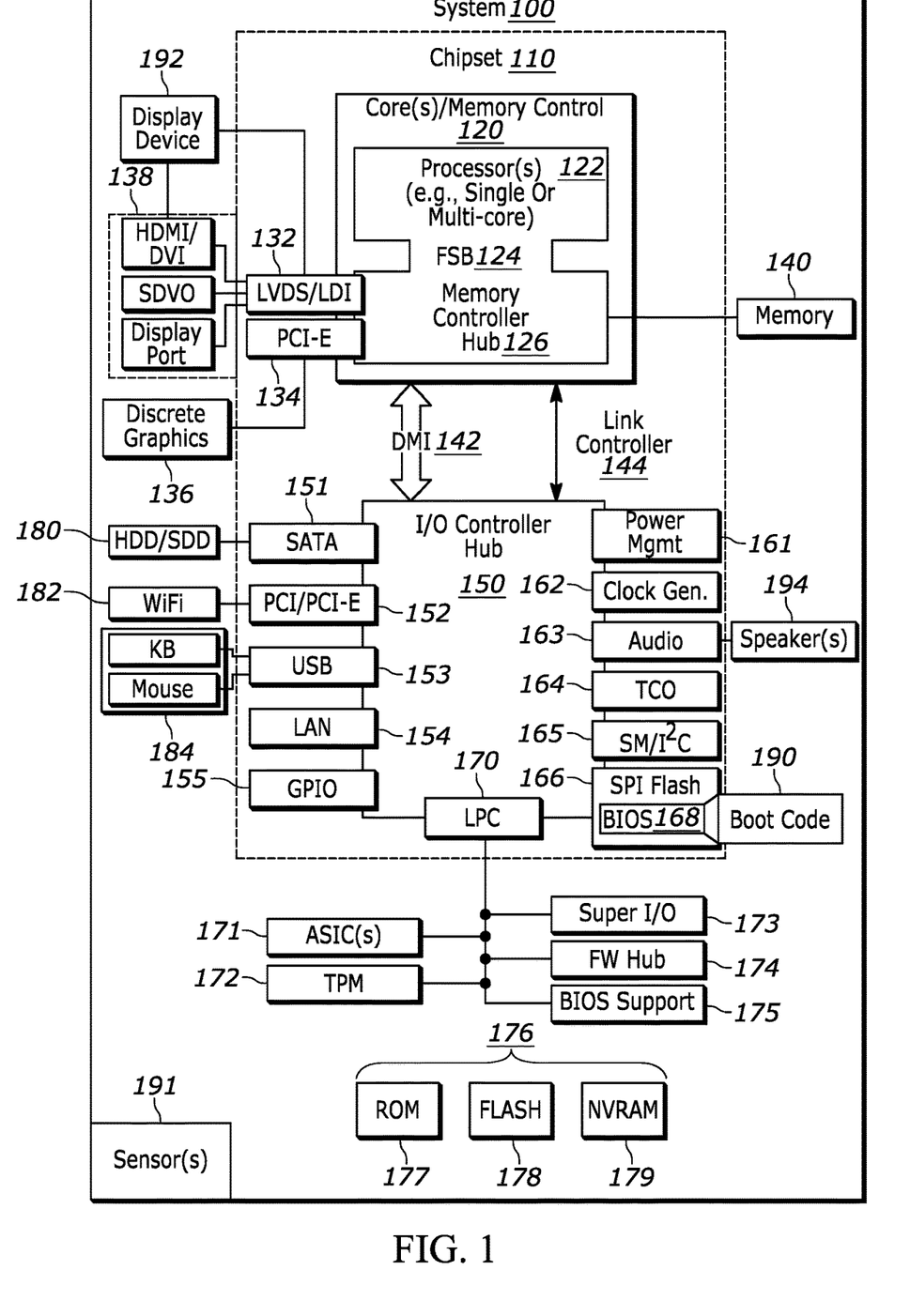
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be thermal imaging cameras, infrared (IR) cameras, digital cameras such as webcams, three-dimensional (3D) cameras, and/or cameras otherwise integrated into the system 100 and controllable by the processor 122 to gather still images and/or video. Thus, for example, a camera might be located on a laptop lid to image a user while the lid is open and a user is looking at a display also forming part of the lid so that the system 100 may then execute computer vision using images from that camera consistent with present principles. Or the camera might even be on a headset being worn by the user so that the system 100 may then execute computer vision using images from that camera consistent with present principles. However, note that other cameras that might be used consistent with present principles include stand-alone cameras and cameras located elsewhere within the user's environment that might still communicate wiredly or wirelessly with the system 100 (including, for example, cameras located on other devices like a user's nearby smartphone).

In addition to or in lieu of the foregoing, the sensors 191 may include one or more inertial measurement sensors that might be included in an inertial measurement unit (IMU). For example, the system 100 may be embodied in a headset and the inertial measurement sensors may be located on the headset. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

The one or more sensors 191 might also include other sensors that can sense head movements of a user consistent with present principles, such as light detection and ranging (LIDAR) sensors, other types of time of flight sensors (such as ultrasonic time of flight sensors), etc. But regardless of type used, it is to be understood that one or more of the sensors 191 may be used for determining extreme and/or repetitive head movement consistent with present principles.

Still further, though not shown for simplicity, the system 100 may include an audio receiver/microphone that provides input from the microphone to the processor 122 based on audio that is detected, such as via a user providing audible input to the microphone. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
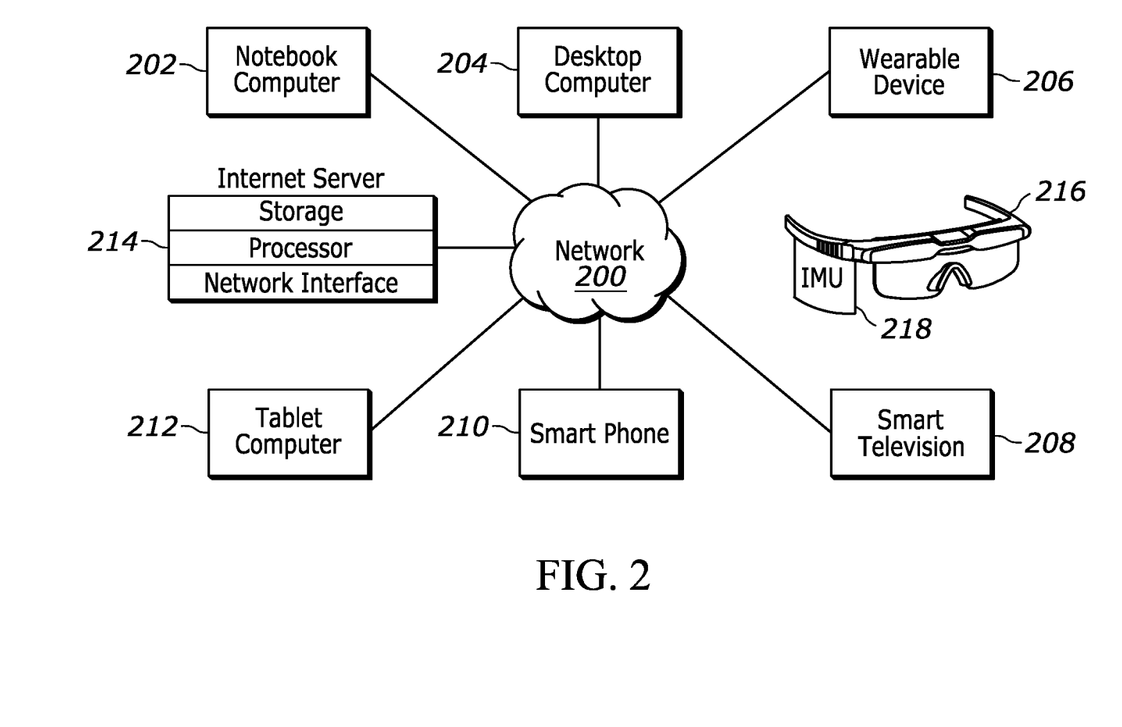
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 may be configured to communicate with each other over the network 200 to undertake present principles.

Describing the headset 216 in more detail, it might be, for example, electronic smart glasses, an augmented reality (AR) headset, a virtual reality (VR) headset, etc. And as shown in FIG. 2, in addition to having other system components as described above in reference to FIG. 1, it might have an IMU 218 specifically that may be used for sensing head movements and amounts consistent with present principles. Additionally, though not shown for simplicity, the headset 216 may also include a camera that may be used for executing computer vision also for sensing head movements and amounts consistent with present principles.

Figure 3A:
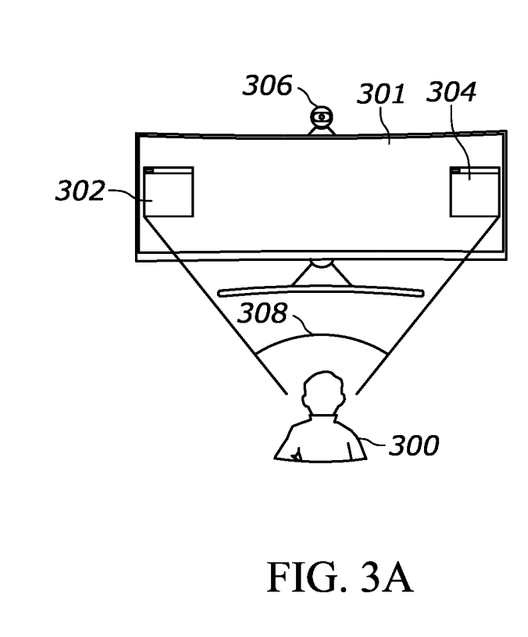

Now in reference to FIG. 3A, suppose an end-user 300 is going back and forth between viewing a first graphical object (an active window 302 in this case) that is presented on a display 301 at a first display location and a second graphical object (a non-minimized window 304 in this case) that is presented on the display 301 at a second, different display location. The device presenting the graphical objects 302, 304 on the display 301 might use input from one or more sensors, such as a camera 306 mounted on top of the display 301, to determine that the user is relatively frequently moving his/her head between the objects 302, 304 and/or is moving his/her head a relatively extreme amount between the objects 302, 304 to view the objects 302, 304.

Figure 3B:
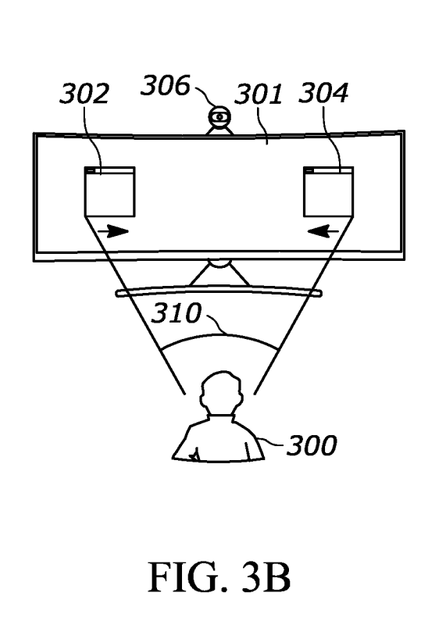
Figure 3C:
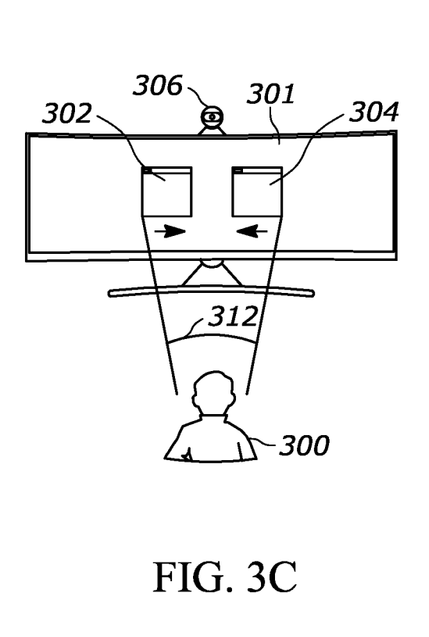

As shown in FIG. 3B, based on detecting this frequent or extreme head movement, the device may begin progressively moving the graphical objects 302, 304 across the display 301 toward each other. In the present example, the device may progressively move the objects 302, 304 toward each other along a common horizontal axis in an X-Z plane established by the front face of the display 301 (e.g., the axis running through the geometric centers of the graphical objects 302, 304). Thus, presentation of the objects 302, 304 may change over time so that the user's viewing angle between the objects 302, 304 is progressively reduced from a relatively large angle 308 as shown in FIG. 3A to a smaller angle 310 as shown in FIG. 3B and ultimately to an even smaller angle 312 as shown in FIG. 3C. The device may then maintain presentation of the objects 302, 304 at the display locations shown in FIG. 3C, helping to reduce neck strain that might otherwise occur if the objects 302, 304 were still presented according to the angle 308 and the user 300 went back and forth between viewing the objects 302, 304 according to the angle 308.

Figure 4A:
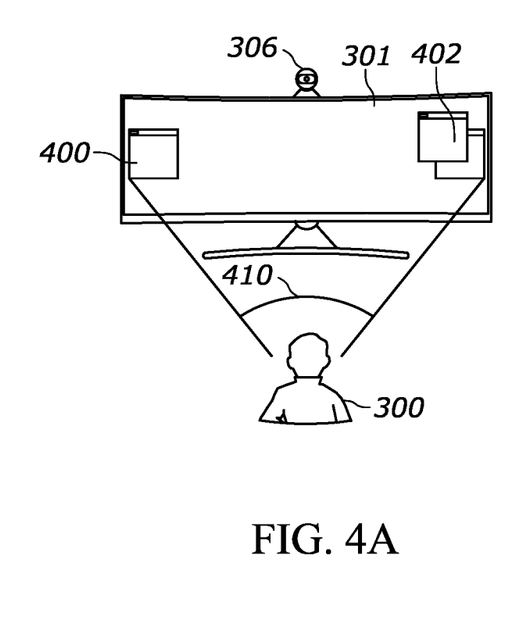
Figure 4B:
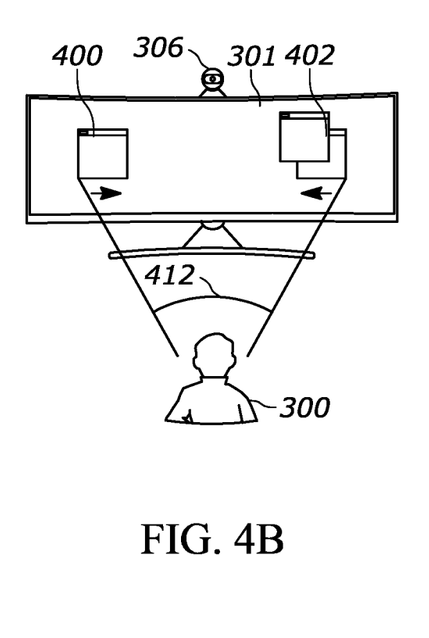
Figure 4C:
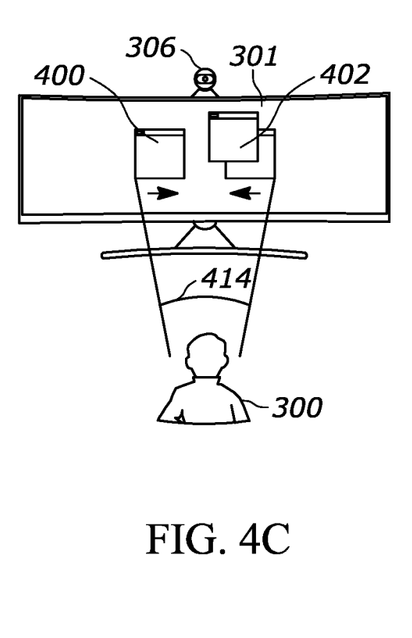

FIGS. 4A-C show another example. Here, the distance between a first graphical object 400 which is a single active window and a second graphical object 402 which is a cluster of plural overlapping, non-minimized windows may establish a relatively extreme viewing angle 410 as shown in FIG. 4A. Based on the device identifying this relatively extreme angle 410 and/or based on the device identifying relatively too frequent head movement between viewing the objects 400, 402 according to the angle 410 (e.g., using input from the camera 306), the device may begin progressively moving the graphical objects 400, 402 toward each other over time and along a common horizontal axis running through the geometric centers of the graphical objects 400, 402 as shown in FIG. 4B (establishing viewing angle 412). The device may then continue to progressively move the objects 400, 402 toward each other until the graphical objects 400, 402 are presented at even closer display locations that result in a viewing angle 414 as shown in FIG. 4C that the device determines is not too extreme. Thus, neck strain may be reduced compared to if the user were still viewing the objects 400, 402 according to the angle 410.

Figure 5A:
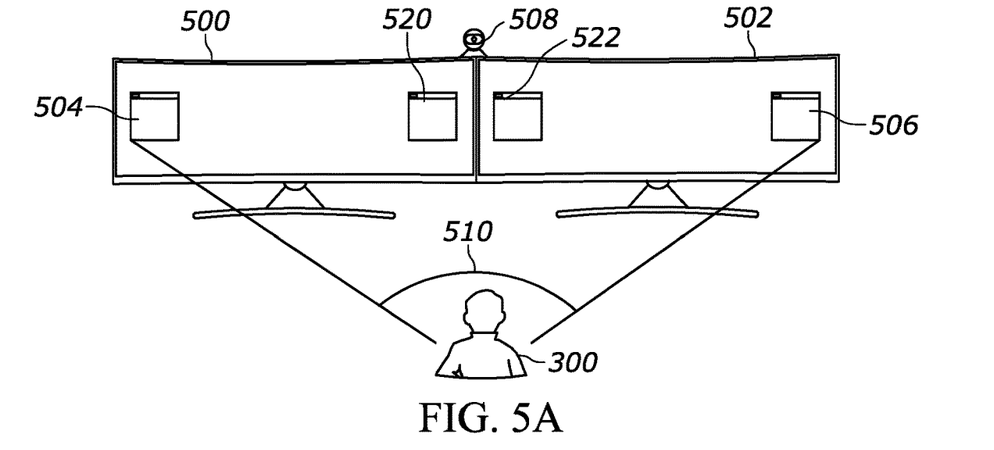
Figure 5B:
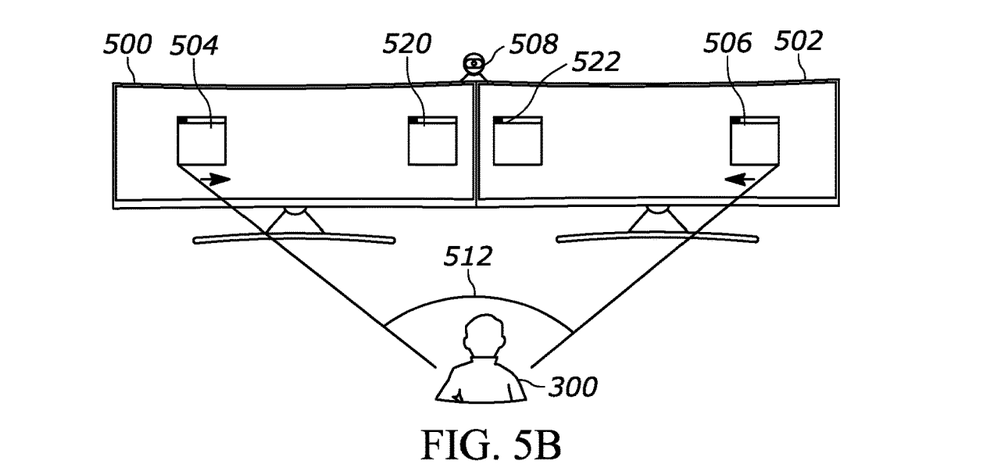
Figure 5C:
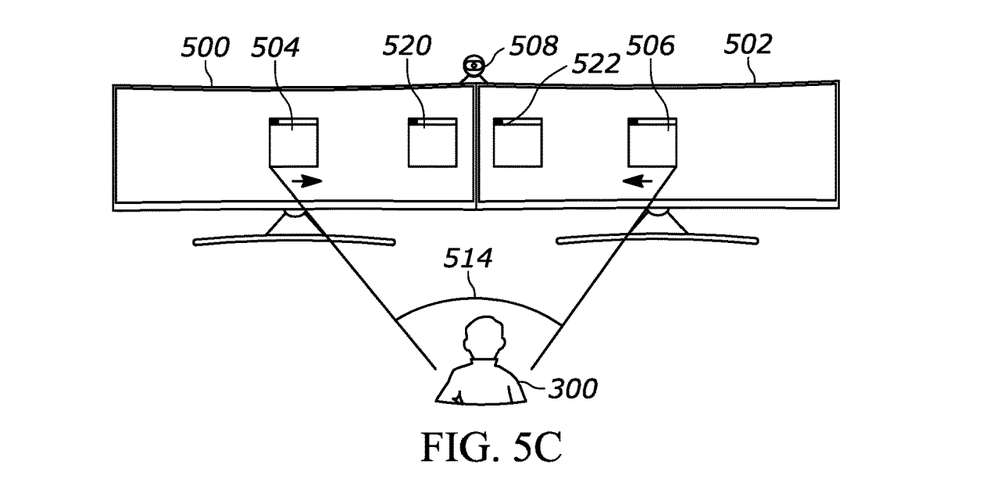

FIGS. 5A-C show yet another example. Here, instead of plural graphical objects progressively moving across a single display, graphical objects 504, 506 may progressively move toward each other across two respective displays 500, 502 being used in tandem to jointly establish a common or united virtual desktop. As shown in FIG. 5A, a relatively extreme viewing angle 510 exists between the objects 504, 506. The angle 510 may be identified by the device based on the known coordinates of the objects 504, 506 and based on input from a camera 508 mounted on the bezel/housing of one or more of the displays 500, 502 to identify a distance from the user 300 to an X-Z plane established by the front face of the displays 500, 502. Then based on the device identifying relatively repetitive or extreme head movement of the user 300 between viewing the objects 504, 506 according to the angle 510, the device may begin progressively moving the objects 504, 506 toward each other over time as shown in FIG. 5B (to establish a viewing angle 512 at a certain point in time). Also note that additional graphical objects 520, 522 might also be presented on the displays 500, 502 as shown, and so the objects 504, 506 may move not just horizontally toward each other but also horizontally toward the objects 520, 522 along a common axis so that all four objects are ultimately presented along this axis and within a viewing angle 514 defined by outer left/right bounds of the objects 504, 506 as shown in FIG. 5C. Thus, here too neck strain may be reduced.

However, further note consistent with present principles that the graphical objects 504, 506 need not necessarily move along a common horizontal axis if the objects 504, 506 are also vertically offset from each other. Instead, the objects 504, 506 may still move to closer horizontal display locations in the X dimension alone (that are still between the initial/prior display locations) while remaining vertically offset. Or, in some examples even if initially vertically offset, the objects 504, 506 may be moved not just horizontally closer to each other but also moved up/down so that their geometric centers are commonly located along the same horizontal axis. This may occur even if, for example, the front faces of the displays 500, 502 are not exactly aligned in a common vertical plane but are angled differently in the Y dimension (or are otherwise offset or positioned differently in the Y dimension).

Moreover, note that the principles above may apply to graphical objects that might be presented vertically with respect to each other rather than horizontally as shown in FIGS. 3A-5C so that the graphical objects may still be progressively moved closer to each other in the Z dimension (height dimension for the display(s) themselves), whether horizontally offset in the X dimension or not.

Also note that in some examples, graphical objects need not be moved along a common axis in the X-Z plane that is orthogonal to either of the X axis or Z axis of the X-Z plane itself, but may instead may be moved along a common diagonal axis in the X-Z plane running through the geometric centers of the graphical objects if, for example, the graphical objects are positioned diagonally with respect to each other in the X-Z plane (or may otherwise be moved closer to each other diagonally). And again note that the X-Z plane may be relative to the Y dimension being depth between the user and display(s).

Thus, it may now be appreciated that neck strain and stressful repetitive/extreme neck movements may be reduced through the device reducing a viewing angle between graphical objects presented on one or more displays. Also note that while the examples of FIGS. 3A-5C use active/non-minimized windows as example graphical objects, graphical objects of other types may also be presented and moved consistent with present principles, such as icons, tiles, AR/VR objects, other 3D objects, virtual drawings and handwritings provided using a stylus or finger, etc. Further note that what might be considered extreme head movement and viewing angles, and/or frequent head movements, as described above may be predefined by a system administrator, end-user, etc.

Figure 6:
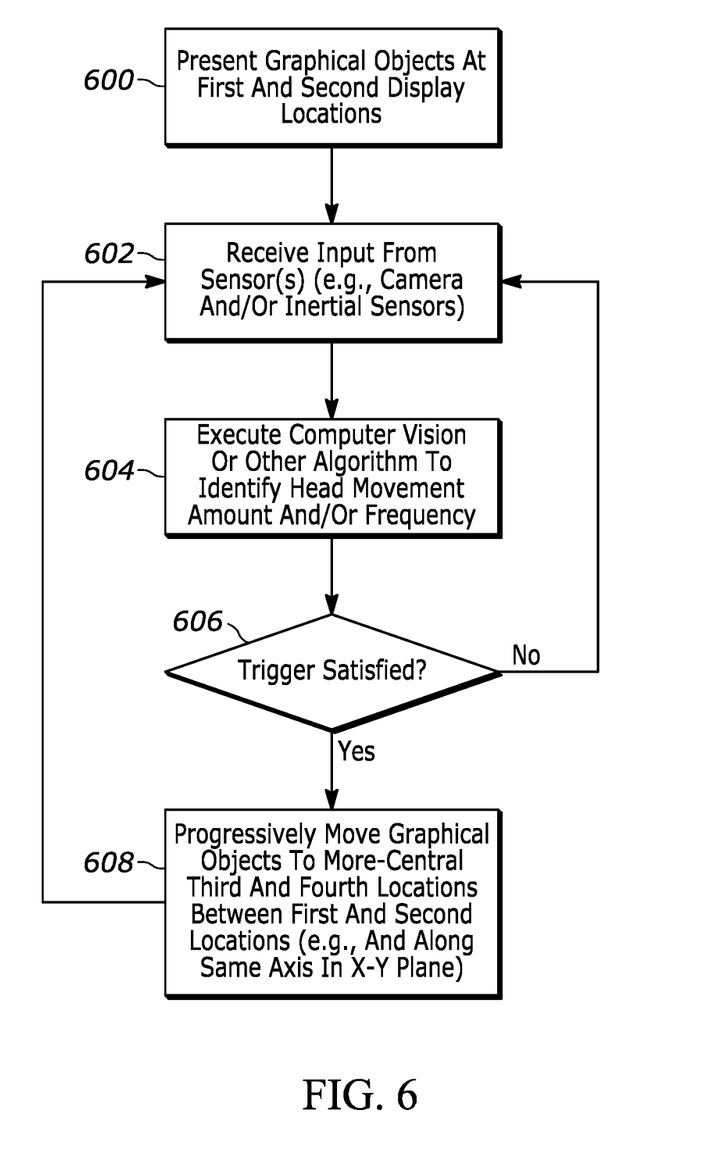
FIG. 6 illustrates example logic in example flow chart format that may be executed by a device consistent with present principles.

Continuing the detailed description in reference to FIG. 6, it shows example logic consistent with present principles that may be executed by one or more devices such as the system 100, a client device, and a remotely-located server in any appropriate combination. Note that while the logic of FIG. 6 is shown in flow chart format, other suitable logic may also be used.

Beginning at block 600, the device may present at least first and second graphical objects at respective first and second display locations. The logic may then move to block 602 where the device may receive input from one or more sensors, such as one of the sensors described above like a camera or inertial sensor or other sensor 191. If a camera is used, the camera may be located on top of a display as described above in reference to FIGS. 3A-5C or might also be located elsewhere within the user's environment, such as on a headset being worn by the user. Thereafter, the logic may proceed to block 604.

At block 604 the device may execute computer vision such as Amazon's Rekognition or Google's Cloud Vision API or other appropriate algorithm/data processing software (such as facial recognition software, spatial analysis software, etc.) to identify a user's head movement amount and/or frequency from the camera input. As another example, positioning algorithms and other signal processing algorithms may be executed to process IMU data such as accelerometer data from an accelerometer on a headset being worn by the user to identify the user's head movement amount and/or frequency from the inertial sensor input.

From block 604 the logic may proceed to decision diamond 606 where the device may, based on the input from the one or more sensors and execution of computer vision or other software, determine that one or more triggers related to head movement are satisfied. The trigger(s) may be related to repetitive head movement of the user and/or extreme head movement of the user.

For example, a trigger may include a particular number of head movements (e.g., regardless of amount) within a predetermined period of time as the user views various parts of the display(s) on which the first and second graphical objects are presented. The particular number of head movements and predetermined period of time may be preset by a manufacturer, system administrator, end user, etc. and may be stored in settings accessible to the device.

As another example, a trigger may include head movements of more than a predetermined amount as the user moves between viewing various parts of the display(s) on which the first and second graphical objects are presented (e.g., regardless of frequency). The predetermined amount may be expressed as a predetermined number of degrees in one or more dimensions and the predetermined amount may also be preset by a manufacturer, system administrator, end user, etc. and stored in settings accessible to the device.

Or in some examples, the trigger may specifically include a particular number of head movements of more than a predetermined amount within a predetermined period of time.

A negative determination at diamond 606 may cause the logic to proceed back to block 602 and continue therefrom. However, responsive to an affirmative determination that the trigger is satisfied, the logic may instead proceed to block 608 where the device may move at least one and even both of the first and second graphical objects (or more) respectively from the first and second display locations to respective third and fourth (or more) display locations. The third and fourth display locations may be closer to each other, between the first and second locations, more centrally-located on the same display (e.g., if one display is being used), and/or more centrally-located relative to an axis defined by a user looking straight ahead according to the user's current body positioning. The logic may then revert back to block 602 to continue therefrom.

Figure 7:
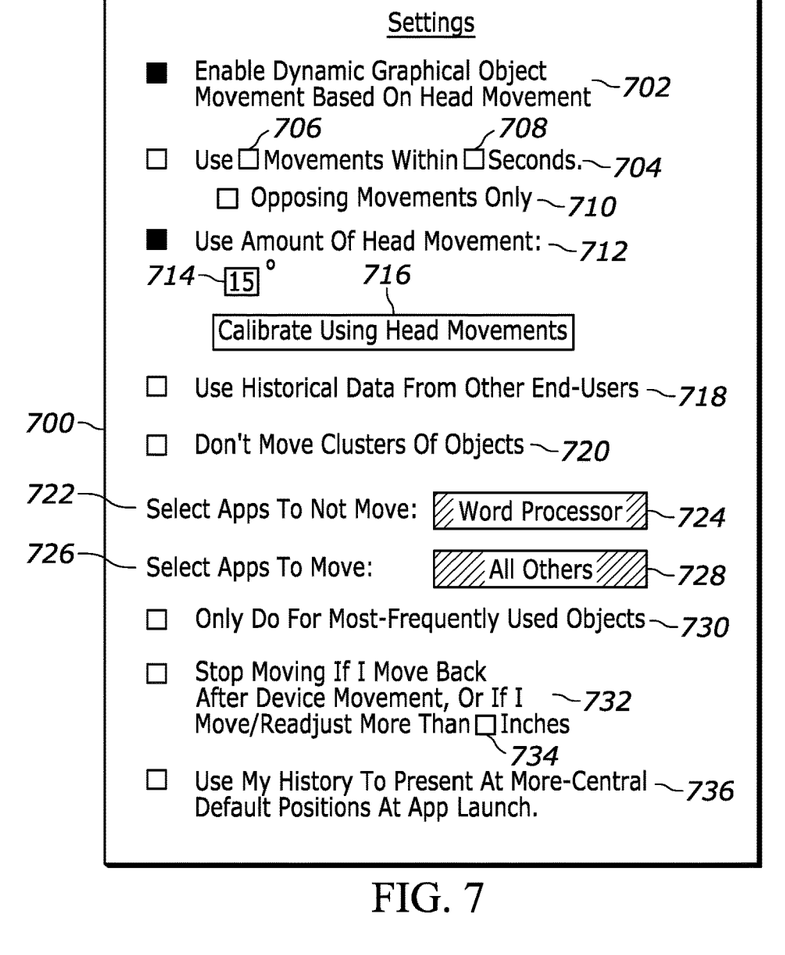
FIG. 7 shows an example graphical user interface (GUI) that may be used to configure one or more settings of a device to operate consistent with present principles.

Now in reference to FIG. 7, it shows an example settings graphical user interface (GUI) 700 that may be presented on a display to configure one or more settings of a device to operate consistent with present principles. For example, the GUI 700 may be presented on a client device display that might be undertaking the logic of FIG. 6, though the GUI 700 may also be presented on a display of a system administrator's device or other device as well.

The settings GUI 700 may be presented to set or enable one or more settings of the device to operate consistent with present principles. For example, the GUI 700 may be reached by navigating a main settings menu of the device or its operating system. Also note that in the example shown, each option or sub-option discussed below may be selected by directing touch, cursor, or other input to the respective check box adjacent to the respective option.

As shown in FIG. 7, the GUI 700 may include an option 702 that may be selectable a single time to set or configure the device, system, software, etc. to undertake present principles in multiple future instances, such as executing the functions described above in reference to FIGS. 3-5 and executing the logic of FIG. 6 in different instances of graphical object presentation.

The GUI 700 may also include an option 704 that may be selectable to use, as a trigger as described above, a particular number of head movements within a predetermined/threshold period of time. The user may establish the particular number of head movements by directing numerical input to input box 706 using a hard or soft keyboard, voice input, etc. The user may also establish the predetermined period of time by directing numerical input to input box 708. Additionally, if desired a sub-option 710 may be selected to configure the device to only use opposing movements between graphical objects presented on a display for rearranging graphical objects as described herein (e.g., to help avoid false triggers). Notwithstanding, further note that in some examples, three or more graphical objects between which the user shifts his/her view may be moved closer together in the X-Z plane as described herein, and in such cases the user's corresponding head movements might not be opposing per se as the user shifts his/her view among the three (or more) objects presented at three (or more) different display locations.

In addition to or in lieu of the above, the user may select option 712 to use head movement of more than a predetermined amount as a trigger. The user may establish the predetermined amount by directing numerical input to input box 714 to establish the amount in terms of degrees, though another unit of measurement may also be used. In the example shown, the option 712 has actually been selected and an end-user has established fifteen degrees of movement as the trigger.

As another example way of predefining what constitutes extreme and/or repetitive head movement for the device to track, in addition to or in lieu of using the options 704 and 712, the user may select the selector 716 using touch, cursor, or other input to initiate a calibration process for customizing extreme/repetitive for that particular user. For example, selection of the selector 716 may instigate a calibration process where the user is presented with a first visual prompt to perform head movements that the user considers to not be extreme and/or repetitive, and then the device may track those movements. Additionally or alternatively, selection of the selector 716 may result in presentation of a second visual prompt to perform head movements that the user considers to be extreme and/or repetitive, and then the device may track those movements. The corresponding head movements themselves may then be labeled as either not extreme/repetitive or extreme/repetitive, and then may be used to train an artificial intelligence (AI) model through machine learning (supervised, semi-supervised, unsupervised, etc.) such as deep learning.

As such, note that an AI model for pattern recognition may be adopted and trained, and that AI model might include one or more artificial neural networks (NNs) such as convolutional neural networks (CNNs) and/or transformers for computer vision. Recurrent neural networks (e.g., long short-term memory (LSTMs) NNs specifically) and/or other NNs suitable for pattern recognition, motion tracking, etc. may also be used and trained alone or in combination with CNNs and transformers. And note more generally that the NNs may include an input layer, an output layer, and multiple hidden layers in between that that are configured and weighted to make inferences about an appropriate output.

Still in reference to FIG. 7, in some examples the GUI 700 may also include an option 718. The option 718 may be selectable to set or enable the device to use historical and/or research data from other end-users on what the other users have indicated as being extreme or repetitive head movement, and/or what empirical research has determined to be extreme or repetitive head movement, to then apply that to another end user. Note that in some examples, the historical or research data may even be adopted at first and then further customizations may be made based on an individual end user's own preferences as described above (e.g., using a calibration process to train an AI model).

If desired, in some examples the GUI 700 may include an option 720. The option 720 may be selected to set or enable the device to not move clusters of objects where at least one active window is overlaid on top of one or more other windows (or other graphical objects) and to, instead, only move single graphical objects while leaving clusters unmoved even if repetitive or extreme head movement is detected.

Still further, in some examples the GUI 700 may include a setting 722 at which a user may select one or more applications (apps) for which graphical objects presented as part of those applications should not be moved even if repetitive or extreme head movement is detected. Thus, a selector 724 may be selected to cause a drop-down list to be presented from which one or more apps may be selected for which associated windows and other graphical objects should not be moved. In the present example, a word processing app has been selected.

Likewise, in some examples a setting 726 may be presented at which a user may select one or more apps for which graphical objects presented as part of those applications may be moved based on repetitive or extreme head movement. Thus, a selector 728 may be selected to cause a drop-down list to be presented from which one or more apps may be selected for which associated windows and other graphical objects may be moved. In the present example, an option from this list to move all other apps besides those already selected from the drop-down list 724 has been selected for the setting 726.

Still further, in some examples the GUI 700 may include an option 730 that may be selected to set or enable the device to only move graphical objects responsive to repetitive or extreme head movement for corresponding apps that the user views or interacts with relatively frequently. Frequency may be defined as a threshold number of glances or gazes within a threshold period of time (e.g., as determined using eye tracking) and/or a threshold number of inputs or interactions being directed to the associated object/app within a threshold period of time. These thresholds may be set by a system admin, end-user, etc. using an input box not shown in FIG. 7 for simplicity.

As also shown in FIG. 7, in some examples the GUI 700 may include an option 732 that may be selectable to set or enable the device to stop moving/no longer move certain graphical objects closer together responsive to repetitive or extreme head movement if the user, after those objects have been moved, moves the objects back to their initial display locations or even to different display locations. Additionally or alternatively, the selector 732 may be selectable to set or enable the device to stop moving/no longer move certain graphical objects closer together responsive to repetitive or extreme head movement if the user, after those objects have been moved, moves the objects more than a threshold distance across one or more displays after the device has stopped moving them closer together. The user may establish the threshold distance themselves as a particular number of inches (or other unit of length) by directing numerical input to input box 734.

Still describing FIG. 7, note that the GUI 700 may also include an option 736. The option 736 may be selected to set or enable the device to use the user's and/or device's history of past graphical object movement based on repeated or extreme head movement to, by default and upon subsequent launch or opening of the associated app itself, present a related graphical object (e.g., app window) at a more-central location to which it was previously moved by the device prior to the app being closed the last time the app was executed.

Figure 8:
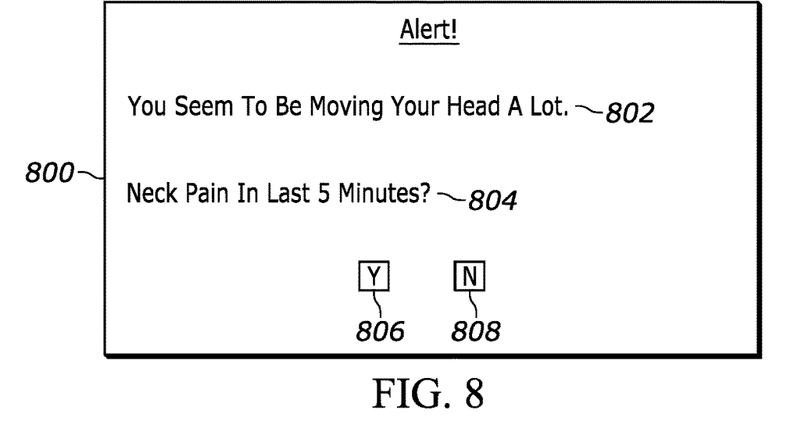
FIG. 8 shows an example GUI that may be presented to prompt a user regarding whether the user has recently experienced neck strain in order to make more-customized neck strain inferences in the future.

Now in reference to FIG. 8, suppose a device operating consistent with present principles infers that an end-user is engaging in repetitive or extreme head movement. Responsive to inferring as much, the prompt/GUI 800 of FIG. 8 may be presented. As shown, the GUI 800 may include an indication 802 that repetitive (and/or extreme) head movement has been detected. The GUI 800 may also indicate a question 804 regarding whether the user has experienced neck pain in the last five minutes (or another period of time). If the user has experienced neck pain, the user may select selector 806 to indicate as much, whereas if the user has not experienced neck pain the user may instead select selector 808 to indicate as much. The user's response may then be used as additional training data to train a model as described above to make better inferences of extreme or repetitive head movement in the future that are more customized to that particular user.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
receive input from one or more sensors;
based on the input from the one or more sensors, determine that a user has made opposing head movements; and
responsive to the determination that the user has made opposing head movements, move at least one graphical object presented on at least one display from a first display location to a second display location.

2. The device of claim 1, wherein the instructions are executable to:
move the at least one graphical object to the second display location as identified as being central to the extremes of the opposing head movements.

3. The device of claim 1, wherein the at least one graphical object comprises a cluster of graphical objects that are moved together to the second display location.

4. The first device of claim 1, wherein the at least one graphical object comprises at least three graphical objects that are moved closer together responsive to the determination that the user has made opposing head movements.

5. The device of claim 1, wherein the instructions are executable to:
move the at least one graphical object to the second display location based on the second display location being more centrally located according to the user's current body positioning.

6. The device of claim 1, wherein the instructions are executable to:
present a settings graphical user interface (GUI) on the at least one display, the settings GUI comprising an option that is selectable to set the device to make inferences about user neck strain and then change presentation of graphical objects in response, the determining and moving steps being executed based on the option being selected.

7. The device of claim 1, comprising the at least one display.

8. A method, comprising:
receiving, at a device, input from one or more sensors;
based on the input from the one or more sensors, determining that a trigger related to head movement is satisfied; and
responsive to the determining, moving a first graphical object presented on at least one display from a first display location to a second display location and moving a second graphical object presented on the at least one display from a third display location to a fourth display location, the second and fourth display locations being between the first and third display locations.

9. The method of claim 8, comprising:
presenting a prompt asking a user whether the user has experienced neck discomfort;
subsequent to presenting the prompt, receiving user input that the user has experienced neck discomfort, the receipt of the user input establishing the trigger; and
responsive to user input that the user has experienced neck discomfort, moving the first graphical object to the second display location and moving the second graphical object to the fourth display location.

10. The method of claim 9, wherein the prompt is presented as part of a graphical user interface (GUI), the GUI comprising a selector that is selectable to provide the user input.

11. The method of claim 9, wherein the prompt asks the user whether the user has experienced neck discomfort within a most-recent particular period of time.

12. The method of claim 9, comprising:
using the user input to train an inference model to make better inferences of extreme and/or repetitive head movements to then move graphical objects in response.

13. The method of claim 12, wherein the inference model comprises a convolutional neural network (CNN).

14. The method of claim 13, wherein the CNN is configured for inferences related to computer vision.

15. The method of claim 12, wherein the inference model comprises a transformer.

16. The method of claim 12, wherein the inference model comprises a recurrent neural network (RNN).

17. The method of claim 16, wherein the RNN is configured for inferences related to pattern recognition and/or motion tracking.

18. The method of claim 8, wherein the trigger comprises a user making opposing head movements.

19. At least one computer readable storage medium (CRSM) that is not a transitory signal, the at least one computer readable storage medium comprising instructions executable by at least one processor to:
receive input from one or more sensors;
based on the input from the one or more sensors, determine that a trigger related to a user moving between viewing a first display location and a second display location is satisfied; and
responsive to the determination, move at least one graphical object presented on at least one display from the first display location to a third display location, the third display location being different from the first and second display locations;
wherein the first, second, and third display locations are all along a same axis in an X-Z plane; and
wherein the trigger comprises a particular number of head movements of more than a predetermined amount within a predetermined period of time, wherein the one or more sensors comprise one or more cameras from which the input is received, and wherein the at least one graphical object progressively moves from the first display location to the third display location so that, while progressively moving, the at least one graphical object is presented at a fourth display location between the first and third display locations prior to being presented at the third display location.

20. The CRSM of claim 19, wherein the trigger comprises a user making opposing head movements.

* * * * *